United States Patent [19]

Reiter et al.

[11] 4,439,579

[45] Mar. 27, 1984

[54] PREPARATION OF AQUEOUS THERMOSETTING ELECTRICAL INSULATING VARNISHES

[75] Inventors: Udo Reiter, Mutterstadt; Hans-Uwe Schenck, Wachenheim; Helmut Lehmann, Reinbek; Ferdinand Hansch, Wedel, all of Fed. Rep. of Germany

[73] Assignee: BASF Aktiengesellschaft, Fed. Rep. of Germany

[21] Appl. No.: 373,169

[22] Filed: Apr. 29, 1982

[30] Foreign Application Priority Data

May 29, 1981 [DE] Fed. Rep. of Germany ....... 3121306

[51] Int. Cl.³ .............................................. C08L 79/08

[52] U.S. Cl. ................................ 524/602; 428/473.5; 528/288; 528/289; 528/291

[58] Field of Search ................ 524/602; 528/288, 289, 528/291; 428/473.5

[56] References Cited

U.S. PATENT DOCUMENTS

| | | | |
|---|---|---|---|
| 3,852,246 | 12/1974 | Schmidt et al. | 528/288 |
| 3,966,655 | 6/1976 | Kovacs et al. | 524/602 |
| 4,104,221 | 8/1978 | Janssen et al. | 528/291 |
| 4,127,553 | 11/1978 | Osada et al. | 528/289 |
| 4,179,423 | 12/1979 | Laganis et al. | 524/602 |
| 4,290,929 | 9/1981 | McGregor et al. | 428/473.5 |

FOREIGN PATENT DOCUMENTS

| | | | |
|---|---|---|---|
| 907236 | 8/1972 | Canada | 524/602 |
| 1495182 | 8/1969 | Fed. Rep. of Germany . | |
| 1445263 | 4/1970 | Fed. Rep. of Germany . | |
| 1720321 | 6/1971 | Fed. Rep. of Germany . | |
| 1645435 | 7/1971 | Fed. Rep. of Germany . | |
| 1495100 | 5/1972 | Fed. Rep. of Germany . | |
| 1495152 | 5/1972 | Fed. Rep. of Germany . | |
| 2351077 | 4/1975 | Fed. Rep. of Germany . | |
| 2351078 | 4/1975 | Fed. Rep. of Germany . | |
| 2605790 | 9/1976 | Fed. Rep. of Germany . | |
| 2724913 | 12/1977 | Fed. Rep. of Germany . | |
| 973377 | 10/1964 | United Kingdom . | |
| 1043098 | 9/1966 | United Kingdom . | |
| 1082181 | 9/1967 | United Kingdom . | |
| 1184139 | 3/1970 | United Kingdom . | |
| 1557850 | 12/1979 | United Kingdom . | |

*Primary Examiner*—Ronald W. Griffin
*Attorney, Agent, or Firm*—Keil & Witherspoon

[57] ABSTRACT

Aqueous thermosetting electrical insulating varnishes are prepared by a process wherein hydroxyl-containing polyester-imides which have kinematic viscosities of from 16 to 30 $mm^2 \cdot s^{-1}$ and acid numbers of $<10$, and which have been obtained by condensing aromatic tricarboxylic acid monoanhydrides, aromatic dicarboxylic acids or their esterifiable or transesterifiable derivatives, diamines, diols, and triols containing an isocyanurate ring, are treated, at from 80° to 130° C., in the presence or absence of up to 5% by weight, based on polyester-imide, of an organic solvent, with from 5 to 15% by weight, based on polyester-imide, of ammonia in the form of an aqueous solution, thereby producing aminolysis and hydrolysis so that a neutral or slightly acidic solution results, which is diluted to a viscosity of from 100 to 10,000 mPa.s by adding demineralized water, from 0.1 to 5% by weight, based on polyester-imide, of a water-soluble curing catalyst being added, if desired, after the treatment with ammonia.

The electrical insulating varnishes are used as wire enamels or as impregnating varnishes.

3 Claims, No Drawings

PREPARATION OF AQUEOUS THERMOSETTING ELECTRICAL INSULATING VARNISHES

The present invention relates to a process for the preparation of aqueous thermosetting electrical insulating varnishes, based on polyester-imides, which are useful as wire enamels and impregnating varnishes, and to their use for these purposes, for example for impregnating enameled wire windings.

The preparation of polyester-imides (=PEI), and their use for electrical insulation, have long been known and are described, for example, in German Published Applications DAS No. 1,445,263, DAS No. 1,495,100, DAS No. 1,495,152 and DAS No. 1,645,435.

For easy processing of polyester-imide solutions, the solids content must be relatively low. Because of the specific solubility characteristics of PEI, phenols, cresols, xylenols, N-methylpyrrolidone, etc., must be used as the solvents or solvent mixtures. These solvents are mostly relatively non-volatile and expensive, and some of them have a very unpleasant odor. In order to prevent an odor nuisance, and pollution of the environment, caused by such solvents, very expensive combustion units are required.

As non-polluting and economical alternatives for coating electrical conductors, it has been proposed to use not only solvent-free resin melts but also aqueous systems. Thus, German Laid-Open Applications DOS 2,351,077 and DOS. No. 2,351,078 describe aqueous PEI secondary dispersions. However, these have too low a solids content and moreover require special applicators. German Laid-Open Application DOS No. 2,605,790 describes water-dilutable PEI electrical insulating varnishes which are converted to an aqueous form by means of substantial amounts (5-30, preferably 20-30, % by weight) of tertiary amines plus 5-20% by weight of auxiliary solvents.

German Laid-Open Application DOS No. 1,720,321 describes a process for the preparation of water-dilutable polyester-imide resins, using ammonia. According to this DOS, aromatic tricarboxylic acid anhydrides are first reacted with up to 80% of the stoichiometric amount of primary diamines required for imide formation, and are condensed with an excess of dialcohols and/or trialcohols. The excess alcohol is then distilled off and the condensate is heated to above 80° C. with a small amount of aqueous ammonia, with or without addition of dialcohols, and is then diluted with water.

However, the varnishes thus produced do not conform to the pattern of properties nowadays demanded of conventionally applied polyester-imide wire enamels.

German Laid-Open Application DOS No. 2,724,913 also discloses water-soluble polyester-imide resins and their preparation. However, these lead to products which have to be brought to a pH of >7 with amines, ie. the products then smell strongly of amines, which has an adverse effect on occupational health. Moreover, in this method, as in German Laid-Open Application DOS No. 2,605,790, substantial amounts of auxiliary solvents are used (>10%, as may be seen from the Examples).

It is an object of the present invention to provide a process for the preparation of aqueous thermosetting electrical insulating varnishes, based on polyester-imides, whereby varnishes which do not suffer from the above disadvantages may be obtained in a simple manner.

We have found that this object is achieved by a process for the preparation of aqueous thermosetting electrical insulating varnishes which are suitable for use as wire enamels and impregnating varnishes and are based on polyester-imides which have been obtained by condensing aromatic tricarboxylic acid monoanhydrides, aromatic dicarboxylic acids or their esterifiable or transesterifiable derivatives, diamines, diols, and triols containing an isocyanuarate ring, wherein hydroxyl-containing polyester-imides which have kinematic viscosities of from 16 to 30 $mm^2 \cdot s^{-1}$ (measured in a solution of 1 part of polyester-imide in 2 parts of N-methylpyrrolidone at 30° C.) and acid numbers of <10 are treated, at from 80° to 130° C., in the presence or absence of up to 5% by weight, based on polyester-imide, of an organic solvent, with from 5 to 15% by weight, based on polyester-imide, of ammonia in the form of an aqueous solution, thereby producing aminolysis and hydrolysis so that a neutral or slightly acidic solution results, which is diluted to a viscosity of from 100 to 10,000 mPa.s by adding demineralized water, from 0.1 to 5% by weight, based on polyester-imide, of a water-soluble curing catalyst being added, if desired, after the treatment with ammonia.

These aqueous electrical insulating varnishes are particularly useful as wire enamels or impregnating varnishes.

Surprisingly, the process according to the invention gives completely clear, water-dilutable varnishes which, in respect of heat resistance, are superior to the water-dilutable varnishes obtained with tertiary amines. Moreover, the novel electrical insulating varnishes are cheaper, because of the use of ammonia in place of ethanol-amines, and cause substantially less pollution of the environment. They can be applied to the coating substrate by conventional application systems and prove, after baking, to be at least equivalent, in technical properties, to the conventional polyester-imide varnishes which are dissolved in the organic solvents mentioned above and accordingly present problems of environmental pollution.

As regards the polyester-imides to be used for the process according to the invention, and the components from which they are synthesized, the basic structure of suitable polyester-imides may be found in German Published Applications DAS No. 1,445,263 and DAS No. 1,495,100. The hydroxyl-containing polyester-imide to be used according to the invention is however preferably prepared by the process described in German Laid-Open Application DOS No. 1,495,182.

The PEI's are condensates of aromatic tricarboxylic acid monoanhydrides, aromatic dicarboxylic acids or their derivatives, diamines, diols, and triols containing an isocyanurate ring.

Examples of suitable aromatic tricarboxylic acid monoanhydrides are trimellitic anhydride, 3,4,3'-benzophenone-tricarboxylic acid anhydride and hemimellitic anhydride, the first being preferred.

Examples of suitable aromatic dicarboxylic acids and their esterifiable or transesterifiable derivatives are terephthalic acid, isophthalic acid, benzophenone-4,4'-dicarboxylic acid and esters of aromatic dicarboxylic acids, for example the esters of terephthalic acid with lower alcohols of 1 to 3 carbon atoms, eg. dimethyl terephthalate, dimethyl isophthalate and diethyl terephthalate.

Suitable diamines are, for example, those having primary amino groups bonded to aromatic groups, for example those of the general formula

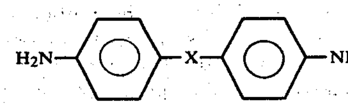

where X is a divalent radical, eg. —$CH_2$—, —O—, —CO—, —S— or —$SO_2$—. Examples of such diamines are diaminodiphenylmethane, diaminodiphenyl oxide and benzophenonediamine.

Suitable diols are the conventional divalent aliphatic alcohols, eg. butane-1,4-diol, trimethylene glycol and, preferably, ethylene glycol.

Suitable triols containing an isocyanurate ring are tris-hydroxyethyl isocyanurate, tris-hydroxypropyl isocyanurate and especially tris-hydroxyethyl isocyanurate (=THEIC). If desired, other triols, eg. glycerol, may also be present in minor amounts of up to 10 mole %, based on total triols.

The tricarboxylic acid monoanhydride, dicarboxylic acid or derivative, diamine, diol and triol are in general employed in a molar ratio of 1.7–2.8/0.5–1.2/0.7–1.4/0-.4–1.2/0.8–1.4, preferably 1.9–2.1/0.7–1.0/0.9–1.1/0-.5–0.8/1.0–1.3.

As already mentioned above, the hydroxyl-containing polyester-imides can be prepared, for example, by the process described in German Laid-Open Application DOS 1,455,182. The condensation is, in that case, carried out in ethylene glycol, giving polyester-imides which no longer contain carboxyl groups and hence have zero acid number.

The hydroxyl-containing polyester imides to be used for the process according to the invention have acid numbers of $<10$, preferably of $<5$, and kinematic viscosities of 16–30, preferably 18–28, $mm^2 \cdot s^{-1}$ (measured in a solution of 1 part by weight of polyester-imide in 2 parts by weight of N-methylpyrrolidone at 30° C.).

The conventional principle of preparation of water-soluble resins by neutralizing free carboxyl groups with amines to form the salts is accordingly not applicable to these PEI's.

According to the invention, the hydroxyl-containing polyester-imides are treated, at 80°–130° C., preferably 90°–110° C., in the presence or absence of up to 5% by weight, based on PEI, of an organic solvent, with from 5 to 15, preferably from 7.5 to 10, % by weight, based on PEI, of ammonia in the form of an aqueous solution, which may for example contain from 5 to 25% by weight of ammonia, thereby producing aminolysis and hydrolysis. This results in a neutral or slightly acidic aqueous solution having a pH of from 6 to 7, preferably from 6.5 to 6.9.

Examples of organic solvents which may be present in amounts of up to 5% by weight, based on PEI, are water-miscible solvents, such as N-methylpyrrolidone, glycols, eg. ethylene glycol, glycol ethers, eg. butylglycol, methyldiglycol, ethyldiglycol and butyldiglycol, and other polar solvents, eg. dimethylformamide and dimethylacetamide.

After the treatment of the PEI with aqueous ammonia, the PEI solution, advantageously cooled to 20°–50° C., can be mixed with 0.1–5, preferably 2–4, % by weight, based on PEI, of a water-soluble curing catalyst, preferably a water-soluble titanate, eg. titanium tetralactate.

The polyester-imide solution is diluted to a viscosity of from 100 to 10,000 mPa.s by addition of demineralized water.

In this diluted form, the polyester-imide solutions prepared according to the invention can be used direct for enameling wires, for example copper wires, or, as impregnating varnishes, for impregnating enameled wire windings. The conventional application methods and apparatus can be used for these purposes.

The baking of the enamel or varnish is in general effected at from 200° to 500° C., preferably from 400° to 520° C.

The aqueous thermosetting polyester-imide varnishes prepared according to the invention have a good shelf life, are completely clear, and do not smell of ammonia. The enamelings and impregnations obtained exhibit excellent properties, inter alia in respect of softening point, heat shock resistance and heat-aging resistance.

In the Examples which follow, parts and percentages are by weight, unless stated otherwise.

EXAMPLE 1

960 parts of trimellitic anhydride (corresponding to 5.0 moles), 485 parts of diaminodiphenylmethane (corresponding to 2.5 moles), 815.5 parts of tris-hydroxyethyl isocyanurate (corresponding to 3.12 moles), 339.5 parts of dimethyl terephthalate (corresponding to 1.75 moles) and 1,375 parts of ethylene glycol are mixed with 2.6 parts of lead acetate and esterified at up to 220° C., until the clear point is reached. The excess ethylene glycol is then distilled off at 150°–200° C. under reduced pressure (40 mm Hg), until the resin, when dissolved in the ratio of 1:2 in N-methylpyrrolidone, shows a viscosity of 19 $mm^2 \cdot s^{-1}$ (in an Ubbelohde No. 3 viscometer) at 30° C. 87.8 parts of N-methylpyrrolidone are then added at 95° C., and 851.4 parts of 25% strength ammonia are introduced slowly. After 1 hour at this temperature, 991 parts of demineralized water are added and the mixture is kept at 100° C. for 3 hours. It is then cooled and 95 parts of titanium tetralactate are added. The aqueous wire enamel thus obtained has a solids content of 52.3% and a flow time of 41 sec in a 4 mm Ford cup according to DIN 53,211.

Using a conventional wire-enameling oven 2.50 m long, the enamel is applied in 8 passes to an 0.5 mm φ copper wire and is baked at 460° C. The draw-off speed is 22 m/min.

On testing according to DIN No. 46,453, the enameled wire had the following properties:

| | |
|---|---|
| increase in diameter | 0.038 mm |
| hardness | 4 H |
| softening point | 335° C. |
| adhesion and extensibility after 25% prestretch (spiral wound on 0.5 mm mandrel): | no cracks |
| heat shock (spiral wound on 0.5 mm mandrel, after 30 minutes' storage at 220° C.): | no cracks |

COMPARATIVE EXAMPLE (according to German Published Application DAS No. 1,720,321)

Example 1 of DAS No. 1,720,321 was repeated and the solution thus obtained was used for coating, with a baking temperature of 460° C. and a draw-off speed of 22 m/min.

| | |
|---|---|
| increase in diameter | 0.036 mm |
| hardness | 3 H |
| softening point | 250° C. |
| adhesion and extensibility after 25% prestretch (spiral wound on 0.5 mm mandrel): | no cracks |
| heat shock (spiral wound on 0.5 mm mandrel, after 30 minutes' storage at 180° C.): | no cracks |

We claim:

1. A process for the preparation of aqueous thermosetting electrical insulating varnishes which are suitable for use as wire enamels and impregnating varnishes and are based on polyester-imides which have been obtained by condensing aromatic tricarboxylic acid monoanhydrides, aromatic dicarboxylic acids or their esterifiable or transesterifiable derivatives, diamines, diols, and triols containing an isocyanurate ring, wherein hydroxyl-containing polyester-imides which have kinematic viscosities of from 16 to 30 $mm^2 \cdot s^{-1}$ (measured in a solution of 1 part of polyester-imide in 2 parts of N-methyl-pyrrolidone at 30° C.) and acid numbers of $<10$ are treated, at from 80° to 130° C., in the presence or absence of up to 5% by weight, based on polyester-imide, of an organic solvent, with from 5 to 15% by weight, based on polyester-imide, of ammonia in the form of an aqueous solution, thereby producing aminolysis and hydrolysis so that a neutral or slightly acidic solution results, which is diluted to a viscosity of from 100 to 10,000 mPa.s by adding demineralized water, from 0.1 to 5% by weight, based on polyester-imide, of a water-soluble curing catalyst being added, if desired, after the treatment with ammonia.

2. A process as set forth in claim 1, wherein trishydroxyethyl isocyanurate is used as the triol containing an isocyanurate ring.

3. A process as set forth in claim 1 or 2 wherein dimethyl terephthalate is used as the esterifiable or transesterifiable derivative of an aromatic dicarboxylic acid.

* * * * *